Figure 1:
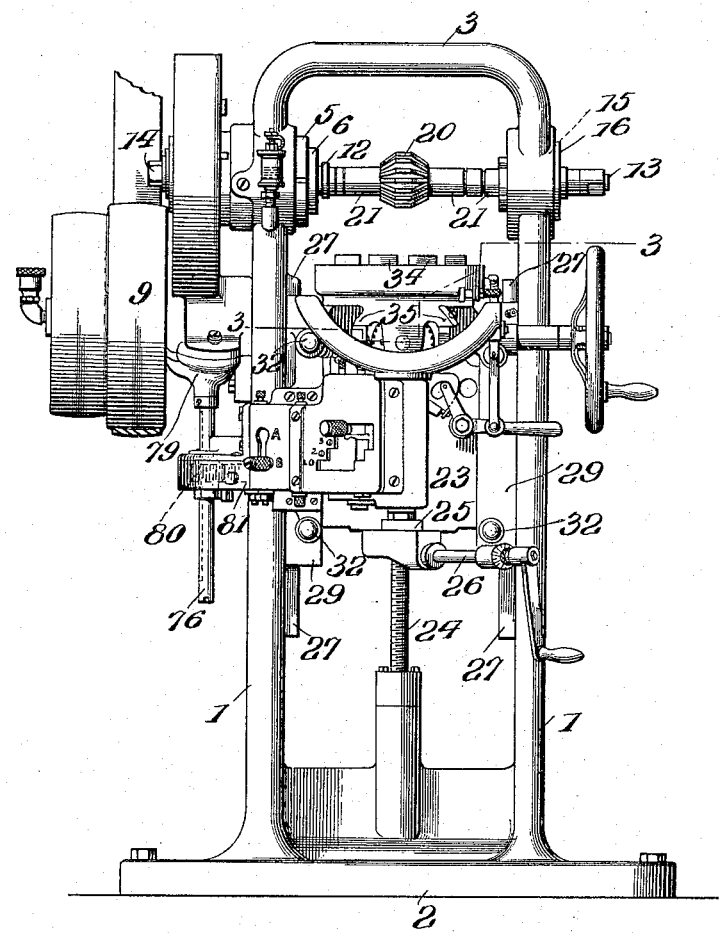

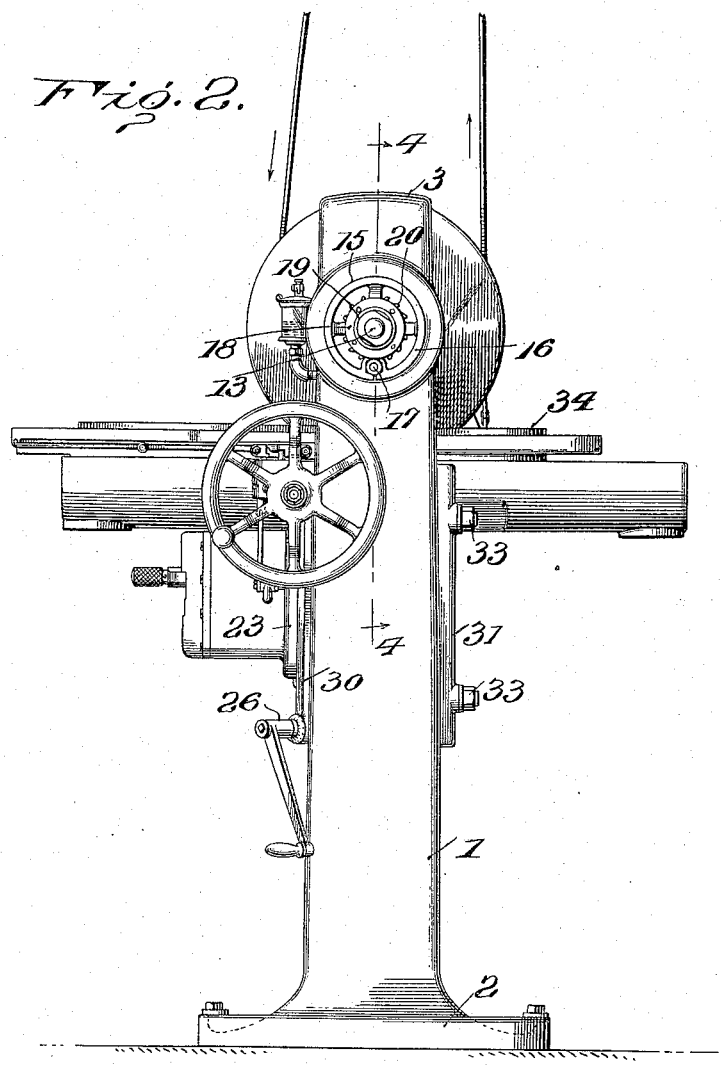

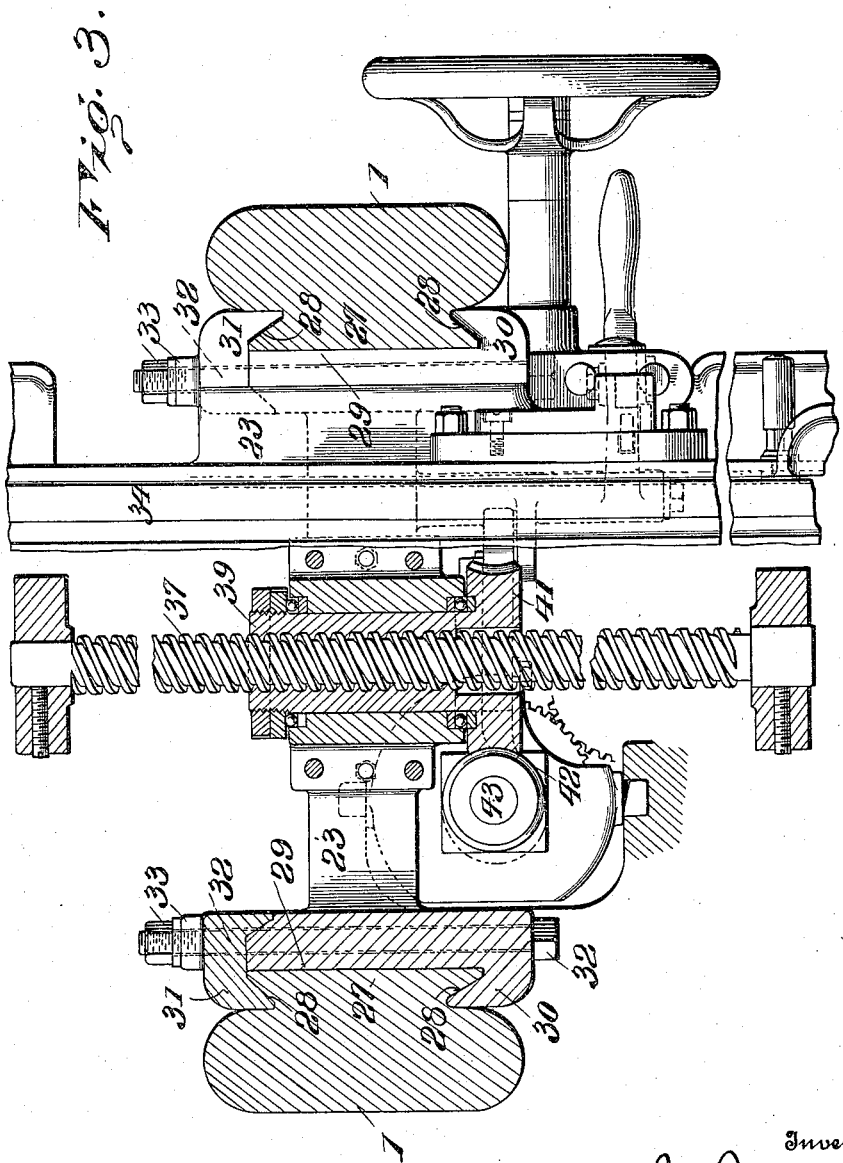

A. J. BRIGGS.
MILLING MACHINE.
APPLICATION FILED AUG. 10, 1914.
1,174,665.
Patented Mar. 7, 1916.
4 SHEETS—SHEET 4.
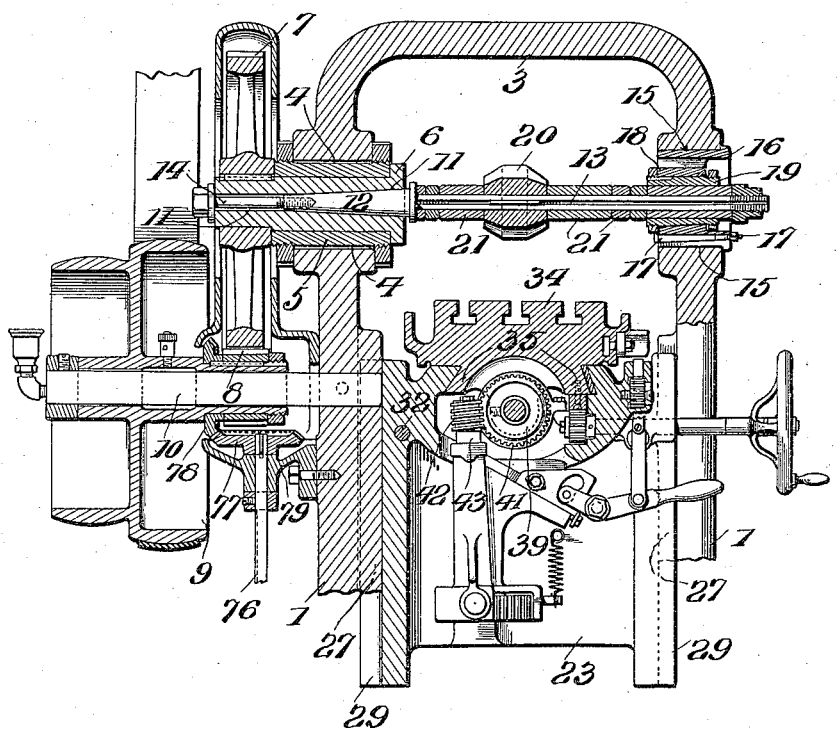
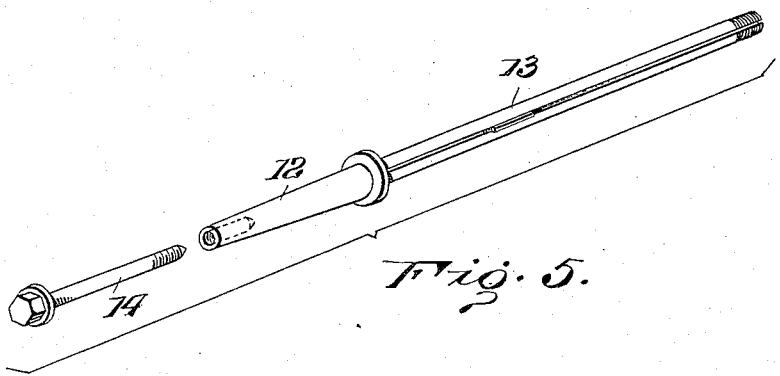

UNITED STATES PATENT OFFICE.

ARTHUR J. BRIGGS, OF SYRACUSE, NEW YORK.

MILLING-MACHINE.

1,174,665.  Specification of Letters Patent.  Patented Mar. 7, 1916.

Original application filed December 6, 1912, Serial No. 735,341. Divided and this application filed August 10, 1914. Serial No. 856,018.

*To all whom it may concern:*

Be it known that I, ARTHUR J. BRIGGS, a citizen of the United States, residing at Syracuse, in the county of Onondaga and State of New York, have invented certain new and useful Improvements in Milling-Machines, of which the following is a specification.

This invention relates to certain improvements in and relating to milling machines and the like; and the objects and nature of my invention will be readily understood by those skilled in the art in the light of the following explanation of the accompanying drawings showing what I now believe to be the preferred embodiment or mechanical expression of my invention from among other formations, arrangements and constructions within the spirit and scope thereof.

An object of the invention is to provide a milling machine or the like, having great rigidity and strength and capable of removing metal with maximum speed and accuracy.

A further object of the invention is to provide a milling machine or the like, of minimum weight and capable of operating on the work with maximum accuracy and of maximum capacity and efficiency.

A further object of the invention is to provide certain improvements in arrangements, constructions and combinations of parts and features whereby a milling machine or the like, of high efficiency and extreme accuracy will be produced.

The invention consists in certain novel features in construction and in combinations and arrangements as more fully and particularly pointed out and specified hereinafter.

Among other features my invention involves, in whole or in part, the following: A rigid double or arched main or supporting frame having approximately the same cross section in each upright. A bed strongly and symmetrically gibbed to both uprights of the rigid arched main frame eliminating the tendency to twist, and the unequal side strains found in other types of milling machines. A large opening in the upright or side of the main frame, opposite the spindle, provided with a bushing which may be easily removed to replace cutters or arbors. The rigid arched main frame having alined bearings whereby a long arbor can be used in connection with a short spindle or driving sleeve running in one of said bearings.

Referring to the accompanying drawings: Figure 1, is a front elevation of a machine embodying one mechanical expression of my invention. Fig. 2, is a side elevation thereof. Fig. 3, is a horizontal cross section taken in the plane of the line 3—3, Fig. 1. Fig. 4, is a vertical section in the plane of the line 4—4, Fig. 2. Fig. 5, is a detail detached perspective of the removable arbor and means for securing the same in the spindle.

In the particular example illustrated by the drawings, I show the machine provided with an upright arched main frame consisting of a pair of vertical parallel spaced strong rigid uprights 1, rising from and integral with a base 2, and connected by and integral with a cross member 3. The member 3, constitutes the upper end of the frame and in the mechanical expression illustrated forms a rigid arch between the uprights 1. The uprights 1, are preferably approximately the same or similar in cross section.

The upper portion of the frame, below the arch 3, is formed with alined enlarged openings extending transversely through the uprights 1, each upright having one opening therethrough. The opening 4, through one of the uprights, the left hand upright in the drawings, is fitted with a suitable bearing, 5, for the short spindle 6. The outer end of this spindle is extended to receive its driving means. In the particular example illustrated, the spindle driving means comprises a spur gear 7, keyed on said extended end of the spindle, and meshing with a pinion 8, driven by belt pulley 9, and mounted on shaft 10, fixed to and projecting laterally from the left hand upright of the frame. The spindle is formed with a longitudinal bore 11, having a taper, to receive the tapered end 12, of the removable arbor 13.

A removable headed bolt 14, can be provided to longitudinally screw into the arbor to tighten, hold and center the arbor end in the spindle bore and in operative driven relation with respect to the spindle. The head of this bolt bears against the outer end of the spindle and is readily accessible for rotation to tightly lock the arbor to the spindle or for unscrewing to permit removal of the bolt and thereby free the arbor for longitudinal outward removal thereof from the inner end of the spindle.

The arbor extends across the space between the frame uprights 1, and through and beyond the enlarged opening 15, in the right hand upright, and a suitable removable support is provided in said opening for the right hand end of the arbor. This removable support, in the particular example illustrated, consists of a split expansible bushing 16, concentrically fitting in said opening and provided with a tapered longitudinally adjustable expanding bolt or key 17, whereby the bushing can be expanded and thereby rigidly locked in the opening, or whereby the bushing can be allowed to contract to its normal external diameter and thereby become loose in the opening to permit removal of the bushing longitudinally and outwardly from the frame upright and the opening therein. The bushing, in the particular mechanical expression illustrated, is formed integral with a central concentric hub 18, connected with the outer wall or circumferential portion of the bushing by several radial webs or spokes. This central hub is fitted with or forms the bearing 19, for the outer end of the arbor and this bearing is preferably adjustable whereby the desired fit on the arbor can be maintained.

The intermediate portion of the arbor between the frame uprights is provided with any suitable rotary cutting saws or milling tools, such as 20, and if so desired, the milling tools can be held in the desired position on the arbor by spacing sleeves or washers 21. The milling cutters are clamped or otherwise confined in the desired position on and to rotate with the arbor by any suitable means and in any suitable manner as will be well understood by those skilled in the art.

The opening 15, through the right hand frame upright is of such diameter as to permit the arbor and its milling cutters to pass longitudinally and outwardly therethrough in the absence of the supporting bushing. The diameter of the opening 15, exceeds the diameter of the largest milling or other cutter the machine is adapted or intended to receive so that the cutter can be freely passed through said opening to or from the arbor, without removing the arbor, or with the arbor if it is desired to apply and remove the cutter with and while on the arbor.

The bushing 16, can be removed from the opening 15, after the key or tapered expanding bolt 17, has been loosened and forced longitudinally in a direction to permit the bushing to contract and loosen in said opening. The arbor and its cutters can then be longitudinally drawn outwardly through the opening with the bushing if so desired, or after the bushing has been removed, the inner end of the arbor having been first released from its driving and centering spindle. If so desired, the arbor can remain fixed and centered in the spindle, and the bushing can be slipped longitudinally and outwardly from the outer end of the arbor, so that the spacing sleeves and cutters can then be freely slipped longitudinally through the opening and from or onto the arbor, for re-adjustment thereon or for application of different cutters thereto.

When the arbor carrying the cutters has been restored to and locked and centered in the spindle, or when the cutters have been properly arranged on the arbor, if the arbor was not removed, the bushing can then be placed on the outer end of the arbor and slipped into proper position in the opening 15, and then expanded by the key or bolt 17, to rigidly lock the same in place in the frame upright. By this arrangement the cutters can be easily and rapidly removed, changed or adjusted at the expenditure of a minimum length of time, and furthermore, the arbor is accurately maintained in proper position and alinement and against undue vibration while the cutters are in action, and I am enabled to employ a short arbor driving and centering spindle mounted approximately throughout its length in a single bearing, thereby maintaining accuracy and alinement rigidity. The arbor is supported at both ends in rigidly connected parts of the frame, and hence objectionable arbor and cutter vibration is eliminated and the utmost accuracy of cutter action is attained.

The machine is provided with a horizontally-disposed bed 23, arranged below the arbor and between the frame uprights 1, and supported thereby and confined or clamped thereto. This bed is rendered vertically adjustable on a vertical fixed threaded shaft 24, (rigid with the base and arranged between the lower portions of the frame uprights) through the medium of a rotary nut 25, mounted in the bed and meshing with and vertically adjustable on said threaded shaft and geared to and rotated by a shaft 26, provided with a hand crank. The frame uprights are formed at their inner or adjoining sides with similar rigid longitudinal guides 27, each having its longitudinal edges 28, oppositely beveled, or undercut. The bed, at the center of its horizontal length is formed with depending opposite side similar vertically-elongated slideways 29, parallel with and arranged between and slidable on said guides, and each at one longitudinal edge having a fixed lip or flange 30, fitting the beveled edge 28, of a guide and at the opposite longitudinal edge having a gib 31, fitting the opposite beveled edge 28, of its guide. The gibs are secured by transverse bolts 32, extending through said slideways of the bed and through the gibs, and provided with exposed and accessible clamping nuts 33. When the bed is to be adjusted vertically, the nuts 33, are loosened to loosen the gibs. The bed can then be freely movable vertically on the guides 27, by rotating the shaft 26, as hereinbefore described.

When the bed has been adjusted to the desired position, the nuts 33, are tightened and the guides of the frame uprights are thereby rigidly gripped between the flanges 30, and gibs 31, of the bed slideways and the bed is thereby most rigidly and firmly secured at both sides to both uprights and thus rigidly held against play and vibration as well as against twisting or torsional strains. The bed thus forms and constitutes a rigid brace and connection between intermediate portions of the frame uprights and corresponds to the rigid arch or cross connection between the upper ends of the uprights. It will be noted that the uprights are rigidly secured together immediately above the arbor, and when the bed is clamped and fixed in position, the uprights are also rigidly secured together and braced immediately below the arbor, and a most rigid structure is thereby produced eliminating objectionable vibration when the cutters are in action and resulting in accuracy and efficiency in production.

A reciprocating work table 34, is arranged below the intermediate portion of the arbor and centrally between the frame uprights and on and carried by the bed. The under side of the table is formed with suitable opposite side or spaced longitudinal parallel guides 35, fitting and longitudinally slidable in the bed.

Any suitable mechanisms can be provided for feeding and controlling the work table, and I do not herein describe and illustrate such means in full inasmuch as means for such purposes are illustrated in my patent application S. No. 735,341, filed December 6, 1912, of which this application is a division. However, I show mechanism, for actuating the feed table on its feeding strokes, including a non-rotary feed screw 37, meshing with rotary feed nut 39, adapted to be driven by worm gearing 41, 42.

The worm gear 42, is carried and driven by a shaft 43. This shaft 43, is actuated by any suitable means, as by a chain of gears from a power shaft 76. This power shaft is vertically arranged to the left of the left hand frame upright 1, and is vertically elongated so as to correspond approximately in length to the range of vertical adjustment of the bed. At its upper end this vertical shaft 76, is mounted in a bracket 79, fixed to said frame upright and forming a part of or carrying a housing for the gearing 7, 8. The shaft 76, is driven through the medium of bevel gears 77, 78, connecting the upper end of said shaft and the power pulley 9, so that said shaft is continuously driven with the arbor driving spindle. The said chain of spur gears comprises and is actuated by a gear 80, splined to and driven by and vertically slidable on, the shaft 76. Said chain or train of spur gears comprising the gear 80, is carried by and mounted in a rigid box or housing 81, fixed to the front left hand portion of the bed and extending horizontally and laterally therefrom across the front edge of the left hand frame upright to and surrounding and carrying the gear 80. This housing or box is rigid with the bed and moves vertically therewith.

It is evident that various changes, modifications and variations in the forms, constructions, and arrangements and combinations described, might be resorted to without departing from the spirit and scope of my invention and hence I do not wish to limit myself to the particular mechanical expression of my invention disclosed hereby except as defined by the appended claims.

Desiring to protect my invention in the broadest manner legally possible, what I claim is:—

1. In combination, frame uprights formed with transverse openings, arbor supporting means arranged in said openings, and an arbor extending between said uprights and at its ends engaging said means and at its portion between said uprights provided with a cutter, said cutter being longitudinally removable through one of said openings, said opening being enlarged with respect to said cutter to permit the longitudinal passage of said cutter therethrough.

2. A milling machine or the like, comprising frame uprights, a rotary spindle mounted in and extending through one of said uprights and provided with driving means and having a tapered bore extending longitudinally therethrough, an opposite portion of the other upright having a transverse opening, and a removable arbor having a tapered end longitudinally and removably entering said bore and at its outer extremity provided with means for longitudinally drawing and tightening said end in said bore, the opposite end of said arbor being arranged and supported in said opening, a portion of said arbor between said uprights being provided with a cutter.

3. A milling machine or the like, comprising an arbor and its cutter, arbor driving means, and spaced frame uprights provided with means for driving and supporting said arbor extending between and at its ends supported by the frame uprights and at its intermediate portion between the uprights provided with a cutter, said arbor and its cutter being removable transversely through one of said uprights, for the purposes substantially as described.

4. In combination, an upright frame comprising uprights connected by a top cross connection and formed with approximately alined transverse openings, an arbor driving spindle mounted in one of said openings, an arbor at one end removably secured to said spindle and at its other end supported in the opening opposite said spindle, the intermediate portion of said arbor between said uprights provided with a cutter, said arbor and its cutter being removable through said last mentioned opening, and a bed provided with means for gripping and interlocking with portions of both uprights below said openings to tie said uprights together and form a rigid cross connection therebetween immediately below said arbor, for the purposes, substantially as described.

5. In a milling machine, or the like, in combination, an upright supporting frame consisting of approximately parallel spaced uprights joined at the top of the frame by a cross connection and at the bottom of the frame by a base, a tool carrying arbor extending between said uprights below said cross connection and at its intermediate portion provided by a tool, means for supporting said arbor in both uprights and for rendering said arbor with its tool removable transversely through one of said uprights, actuating means for said arbor, and a bed arranged immediately below said arbor and at both ends provided with means for rigidly clamping said bed to portions of both uprights to form a cross connection between and rigidly securing together said portions of said uprights.

6. In a milling machine or the like, a supporting frame consisting of rigid uprights and upper and lower cross connecting portions integral therewith, a bed arranged between said uprights and at its opposite sides having means for rigidly clamping the same to both uprights between said upper and lower portions, and thereby constituting an intermediate cross brace for said uprights, an arbor extending between said uprights and at its ends supported therein and at the intermediate portion adapted to receive the milling cutters or the like, and actuating means for said arbor.

7. A milling machine or the like, comprising a supporting frame formed in one piece and consisting of a base and a pair of uprights having their upper ends joined by a cross connection, a bed arranged between and having means for rigidly securing its opposite sides to said uprights, a table on said bed, an arbor above said table and at its ends supported in said uprights and at its portion between said uprights provided with a milling cutter or the like, and means for rotating said arbor.

8. In a milling machine or the like, in combination, a supporting frame comprising a pair of rigidly connected spaced uprights, a short spindle rotatably mounted in and extending through one of said uprights and provided with driving means, the opposite upright having an enlarged opening, an arbor at one end removably secured to said spindle and driven thereby, removable supporting means in said opening for the opposite end of said arbor, and a milling cutter or the like arranged on the arbor between said uprights.

9. In a milling machine or the like, in combination, a supporting frame comprising uprights, one of said uprights provided with arbor driving means, the opposite upright having an enlarged opening, an arbor and its milling cutters or the like, insertible and removable longitudinally through said opening and at one end operatively engaging said driving means, and removable supporting means for the opposite end of said arbor, said removable supporting means being normally fitted and secured in said opening.

10. In a milling machine or the like, in combination, a supporting frame, an arbor, an arbor driving member mounted in a portion of said frame and removably receiving one end of said arbor, an opposite portion of said frame having an enlarged opening alined with said member and of a size to permit longitudinal movement therethrough of the arbor and the cutting tools thereon, and a removable bushing normally fitted and secured in said opening and provided with a bearing for the other end of said arbor.

11. In a milling machine or the like, in combination, a frame comprising rigid spaced uprights, one of said uprights having an arbor driving spindle mounted therein, the other upright having an enlarged opening, an arbor at one end fitted to said spindle, said arbor and the milling or other cutters thereon being removable longitudinally through said opening, and removable means normally fixed in said opening to support the outer end of the arbor.

12. In a milling machine or the like, in combination, a frame comprising rigid spaced uprights, one of said uprights having an arbor driving spindle mounted therein, the other upright having an enlarged opening, an arbor at one end fitted to said spindle, the opposite end of said arbor extending outwardly toward said enlarged opening, a milling cutter removably arranged on the portion of the arbor between said uprights and longitudinally removable therefrom through said opening, and removable means normally fixed in said opening to support the outer end of the arbor.

13. In a milling machine or the like, in combination, a frame comprising rigidly connected opposite portions, an arbor driving spindle mounted in one of said portions, the other portion having an enlarged opening alined with said spindle for the longitudinal passage of the arbor and its milling cutters or the like to and from said spindle, one end of the arbor being fitted to and centered by said spindle, the other end of the arbor being arranged in said opening, and a support in said opening providing a bearing for the other end of the arbor, said support being longitudinally and outwardly removable from said opening and provided with means for normally securing the same in said opening.

14. In a milling machine or the like, in combination, a frame, an arbor provided with driving means and at one end supported in one portion of said frame, another portion of said frame having an enlarged opening at the opposite end of said arbor, said opening being of a size to permit longitudinal passage therethrough of the milling cutters to and from and longitudinally of said arbor, and an expansible bushing removably located in said opening and provided with means whereby the same can be locked in said opening, said bushing provided with a support for the end of said arbor at said opening.

15. In a milling machine or the like, in combination, a frame comprising a pair of spaced rigid uprights rigidly connected together at their upper portions by a cross member, one of said uprights having an opening therethrough, a bearing in said opening, a spindle confined in said bearing and at its outer projecting end provided with driving means, said spindle provided with a longitudinal arbor end receiving and centering bore, a removable arbor extending between said uprights and at one end removably fitted in said bore and provided with means for longitudinally drawing and securing the same therein, the opposite upright having an enlarged opening longitudinally receiving the opposite end of said arbor and of a size to permit longitudinal passage therethrough of the milling cutters carried by said arbor, and means for supporting the outer end of said arbor located in said enlarged opening, said means being longitudinally removable from said opening and provided with mechanism for locking the same therein.

16. In a milling machine, in combination, a supporting frame comprising a pair of spaced parallel rigid uprights joined together at their upper and lower ends, a longitudinally-removable arbor extending between said uprights and at its ends mounted therein and at its intermediate portion adapted to receive and drive milling cutters supporting means for said arbor, intermediate portions of said uprights having alined transverse openings receiving said arbor supporting means and for the longitudinal removal thereof, actuating means for said arbor, a bed arranged between said uprights below said arbor and provided with means for rigidly locking said bed to both uprights and to form a rigid connection therebetween, means whereby said bed can be adjusted vertically with respect to said uprights, a work table carried by said bed, and feed mechanism therefor.

17. In a milling machine, in combination, a supporting frame comprising a pair of approximately-similar parallel spaced rigidly-joined uprights having their inner sides formed with parallel longitudinal guides, a vertically adjustable bed provided with adjusting means and arranged between said uprights and at its opposite sides having vertical slideways receiving said guides and provided with gibs and transverse bolts whereby said gibs and the slideways can be rigidly locked or clamped to said guides, a work table mounted on said bed, intermediate portions of said uprights above said guides being formed with transverse alined openings, a rotary arbor driving spindle longitudinally arranged in one of said openings, an arbor support longitudinally arranged in the other opening, and a longitudinally removable arbor at its ends engaging said spindle and said support and at its intermediate portion adapted to receive a cutter longitudinally removable therewith.

18. In combination, an upright one-piece loop-like or encircling frame forming a base, a top and parallel approximately-similar spaced uprights, said uprights forming longitudinal guides having undercut longitudinal edges, a bed arranged between said uprights and having vertical ways parallel with and abutting said guides provided with clamping means fitting said longitudinal edges for rigidly locking said uprights to said bed with said guides and said ways held together, said uprights having alined openings extending transversely therethrough below said top and above said bed, a longitudinally removable rotary arbor adapted at its central portion to carry cutting means arranged above said bed, and supporting bearings for said arbor and adapted to receive the ends thereof, said bearings being arranged in said openings, substantially as described.

19. In combination, an upright loop-like one-piece rigid frame forming a base, a top and approximately similar spaced uprights, one of said uprights having a rotary spindle mounted therein and extending therethrough and at the outer side of said upright provided with driving means, the other upright formed with a transverse opening alined with said spindle, a rotary cutter arbor driven by said spindle and fitted thereto and extending through said opening, the portion of said arbor between said uprights provided with a rotary cutter and said arbor and its cutter being longitudinally removable through said opening.

20. In combination, spaced frame uprights formed with transverse alined openings, an arbor driving spindle longitudinally arranged in one of said openings and at its outer end provided with driving means, a longitudinally removable arbor bearing arranged in the other opening, and a longitudinally removable arbor extending between said uprights and at its central portion provided with a cutter longitudinally movable through said other opening when said opening is not occupied by said bearing, one end of said arbor being applied to and supported by said spindle and the other end of said arbor being applied to said bearing, substantially as described.

21. In combination, a one-piece frame consisting of uprights joined by a top cross connection and cast with approximately-alined unbroken eyes arranged intermediate the lengths of the uprights and forming transverse openings therethrough, the portions of said uprights contiguous to said eyes being approximately similar in cross section, portions of said uprights below said eyes forming longitudinal tranversely-under-cut seats, a bed extending between said uprights and fitting said seats and provided with means for rigidly clamping said bed to and interlocking with said uprights to form a rigid cross connection between and locking said portions of the uprights together, arbor supporting means arranged in said openings, and an arbor extending transversely between said uprights and intermediate said uprights provided with a cutter, substantially as described.

22. In combination, an upright loop-like one-piece supporting frame consisting of parallel uprights connected at their lower ends by a base and at the top by a cross connection and just below said cross connection provided with means to support and drive an arbor extending between said uprights, said arbor removably carried by said means and at an intermediate portion between said uprights provided with a cutter, both uprights being formed with longitudinally arranged transversely under-cut-slideways located below said arbor, and a vertically adjustable bed at its ends fitting said slideways and transversely interlocking therewith and provided with means for rigidly locking the bed and uprights together to form a cross connection locking the uprights together immediaely below the arbor, substantially as described.

23. In combination, a frame, an arbor supported therein at both ends and provided with driving means and at an intermediate portion of its length provided with a cutter, said frame formed with a transverse opening enlarged with respect to said cutter, and a removable expansible bushing arranged in said opening and supporting one end of said harbor and provided with means for locking the bushing in the opening, said cutter being longitudinally removable through said opening after the bushing has been longitudinally removed therefrom, substantially as described.

In testimony whereof I affix my signature in presence of two witnesses.

ARTHUR J. BRIGGS.

Witnesses:
 EARL S. BOYNTON,
 FLOYD COLWAY.

Copies of this patent may be obtained for five cents each, by addressing the "Commissioner of Patents, Washington, D. C."